Aug. 7, 1945.    G. G. WILCOX    2,381,241
SPRING TESTING MACHINE
Filed May 24, 1944    2 Sheets-Sheet 1

Inventor
George G. Wilcox
By Semmes + Parker
Attorney

Aug. 7, 1945.　　　G. G. WILCOX　　　2,381,241
SPRING TESTING MACHINE
Filed May 24, 1944　　　2 Sheets-Sheet 2

Inventor
George G. Wilcox
By Scrivener + Parker
Attorney

UNITED STATES PATENT OFFICE 2,381,241

SPRING TESTING MACHINE

George G. Wilcox, Bristol, Conn., assignor to Associated Spring Corporation, Bristol, Conn., a corporation of Delaware Application May 24, 1944, Serial No. 537,120

2 Claims. (Cl. 73—161)

This invention relates to devices for testing the fatigue life of compression springs, by which is meant the number of times the spring may be compressed without failure.

It is the principal object of the invention to provide a spring testing machine of the described type which will require a much lower power input for each spring tested than is required by known machines.

A still further object of the invention is to provide a spring testing machine of the described type which is so constructed and operative that only a part of the plurality of springs being tested at any time constitute a load on the machine, while the others actually return work to the machine and thereby reduce the power requirement.

Other objects and features of novelty of the invention will be made apparent by the following description and the annexed drawings which, it will be understood, are only illustrative of the invention and impose no limitation thereon not imposed by the appended claims.

Figure 1:
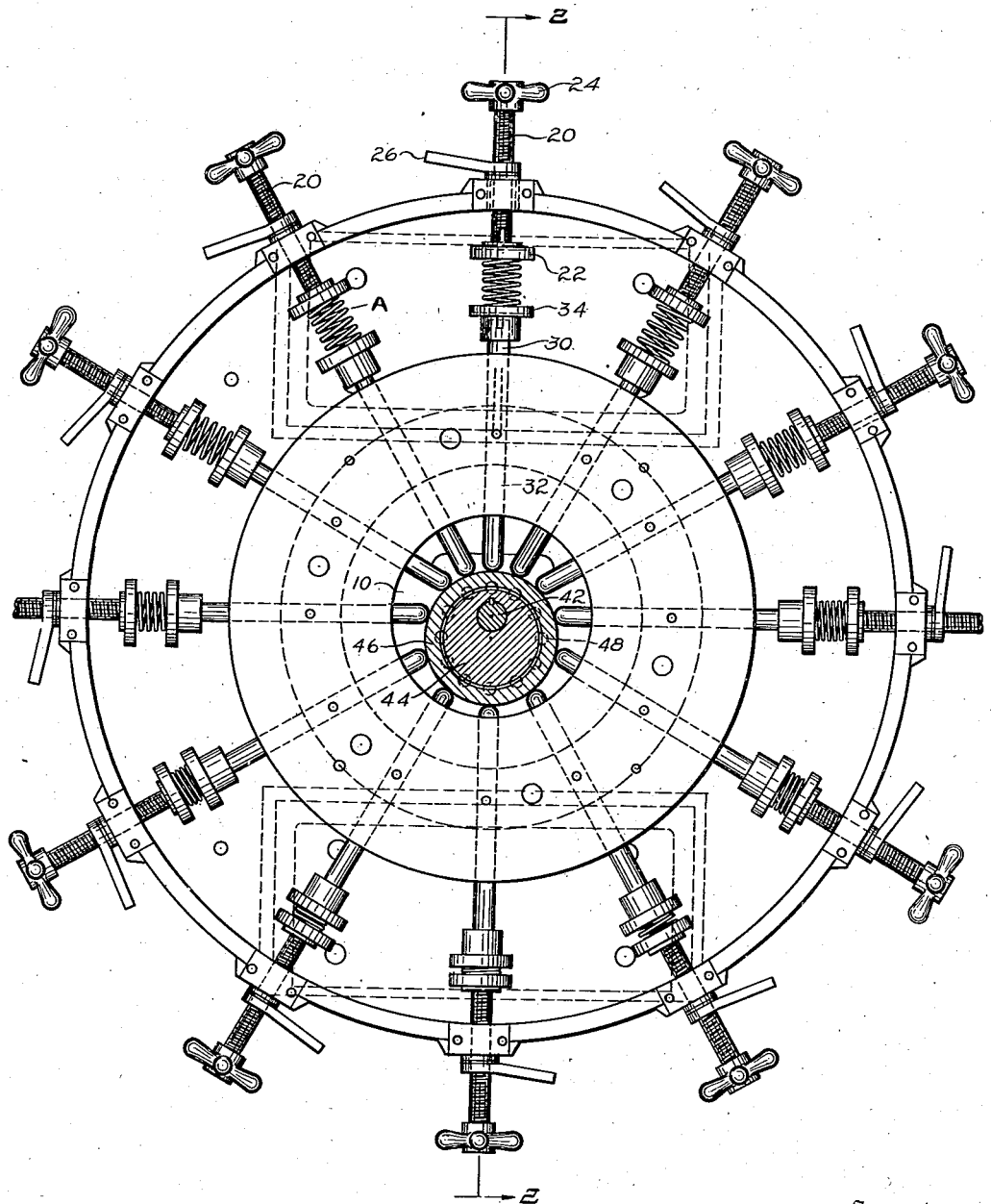
Figure 2:
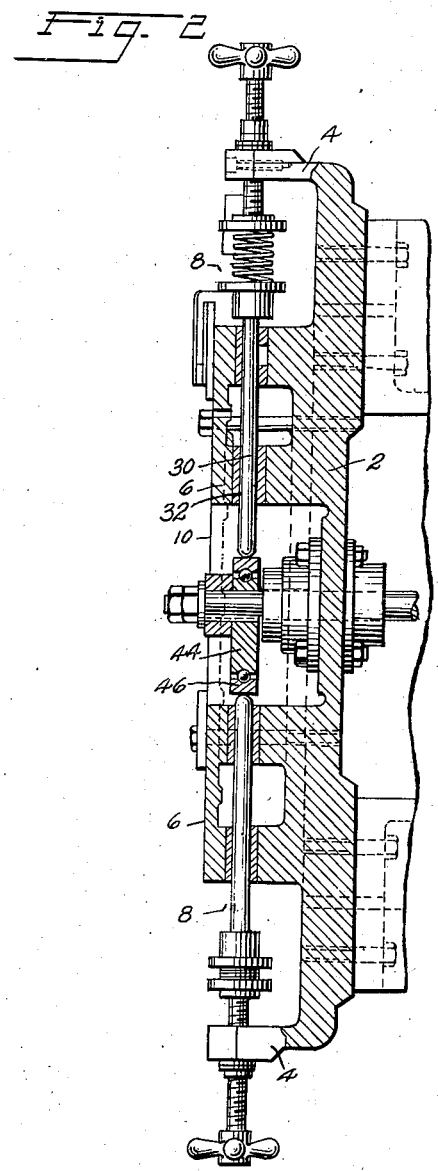

Referring to the drawings in which similar reference numerals refer to like parts, Fig. 1 is an elevational view of a spring testing machine according to the invention;

Fig. 2 is a sectional view taken on line 2—2 of Fig. 1.

The machine illustrated in the drawings and which is constructed in accordance with my invention comprises a circular backing plate 2 having a peripheral flange 4 extending at right angles therefrom. An annular ridge 6 of substantial radial width is integrally connected to the backing plate 2 and extends therefrom in the same direction as the flange 4 and to approximately the same extent, thus forming an annular space 8 between the flange 4 and the ridge 6 and a circular space 10 at the center of the structure and within the annular ridge.

Means are provided by the invention for supporting the springs under test within the annular space 8 and comprise means for rigidly but adjustably supporting the outer end of each spring A and means for reciprocably supporting the inner end thereof whereby each spring is alternately compressed and released as the machine is operated. The means for supporting the outer ends of the springs comprise a plurality of bolts 20 extending radially through the flange 4 and threaded thereto and carrying abutment members 22 at their inner ends within the annular space 8. Handle means 24 may be provided on the outer end of each bolt and clamp means 26 may be associated with each bolt externally of flange 4 in order to hold the bolts in any desired position. In the disclosed embodiment twelve bolts and abutments are shown, being equally spaced about the annular flange 4.

The means for reciprocably supporting the inner ends of the springs under test comprise a plurality of radially-extending rods 30 which are slidably received in radial openings 32 in the annular ridge 6 and each of which is radially aligned with one of the bolts 20. The rods 30 are of such length that the outer end of each is positioned within the annular space 8 and the inner end is positioned within the central space 10. At its outer end each rod carries an abutment member 34 which is opposite and in radial alignment with the abutment 22 on the aligned bolt 20 and is adapted to cooperate with abutment 22 to hold the opposite ends of a helical coil compression spring.

Means are provided by the invention for reciprocating the rods 30 to thereby alternately compress and release the springs held between the abutments. Such means comprise a motor having a shaft 42 which extends axially into the central opening 10 and, within such opening, is connected eccentrically to a circular disk 44 which is surrounded by a ring 46 and separated therefrom by frictionless bearings 48. The inner ends of the rods 30 bear on the annular outer periphery of the ring 46 and are reciprocated radially of the structure by rotation of the shaft and eccentric.

The springs are placed in the machine in the following manner, reference being made to the abutments, 22, 34 at the center of the upper part of Fig. 1. The cam 44 is first rotated until the part of its exterior surface adjacent these abutments is a maximum distance therefrom, i. e. in the position shown in Fig. 1. A spring is now placed between these abutments and the bolt handle 24 operated to screw the abutment 22 inwardly until a predetermined load is placed on the spring, which will be the minimum load thereon during operation of the machine. The cam is then moved successively through 30° increments in order to position each spring in the described manner. Operation of the driving motor will rotate the eccentric 44, thus causing the ring 46 to progressively compress the springs. As some of the springs are expanding and returning work to the system at the same time that others are being compressed the net work done by the driving system is reduced to a minimum.

While I have described and illustrated one embodiment of my invention it will be apparent to those skilled in the art that other embodiments, as well as modifications of that disclosed, may be made and practiced without departing in any way from the spirit or scope of the invention, for the limits of which reference must be had to the appended claims.

I claim:

1. A machine for testing helical coil compression springs comprising a rotatable shaft, a circular disc connected eccentrically to said shaft, a ring surrounding the disc and supported thereon by frictionless bearings, an annular series of devices surrounding said ring and having parts slidably engaging the periphery thereof and each being adapted to support the inner end of one of an annular series of radially positioned helical coil springs, and means for rigidly supporting the outer end of each of said springs whereby rotation of the shaft will cause said springs to be alternately compressed and released.

2. A machine for testing helical coil compression springs by alternately compressing and releasing them, comprising an annular series of devices each of which is adapted to engage and support the outer end of one of a plurality of springs, an annular series of radially reciprocable devices which are respectively radially aligned with the outer supporting devices and each of which is adapted to engage and support the inner end of one of said plurality of springs, a rotatable shaft at the center of said annular series, a circular disk connected eccentrically to said shaft, a ring surrounding said disk and supported thereon by frictionless bearings, and a plurality of connecting rods which slidably engage the periphery of said ring at their one ends and at their other ends are respectively connected to the devices of said second annular series.

GEORGE G. WILCOX.